UNITED STATES PATENT OFFICE.

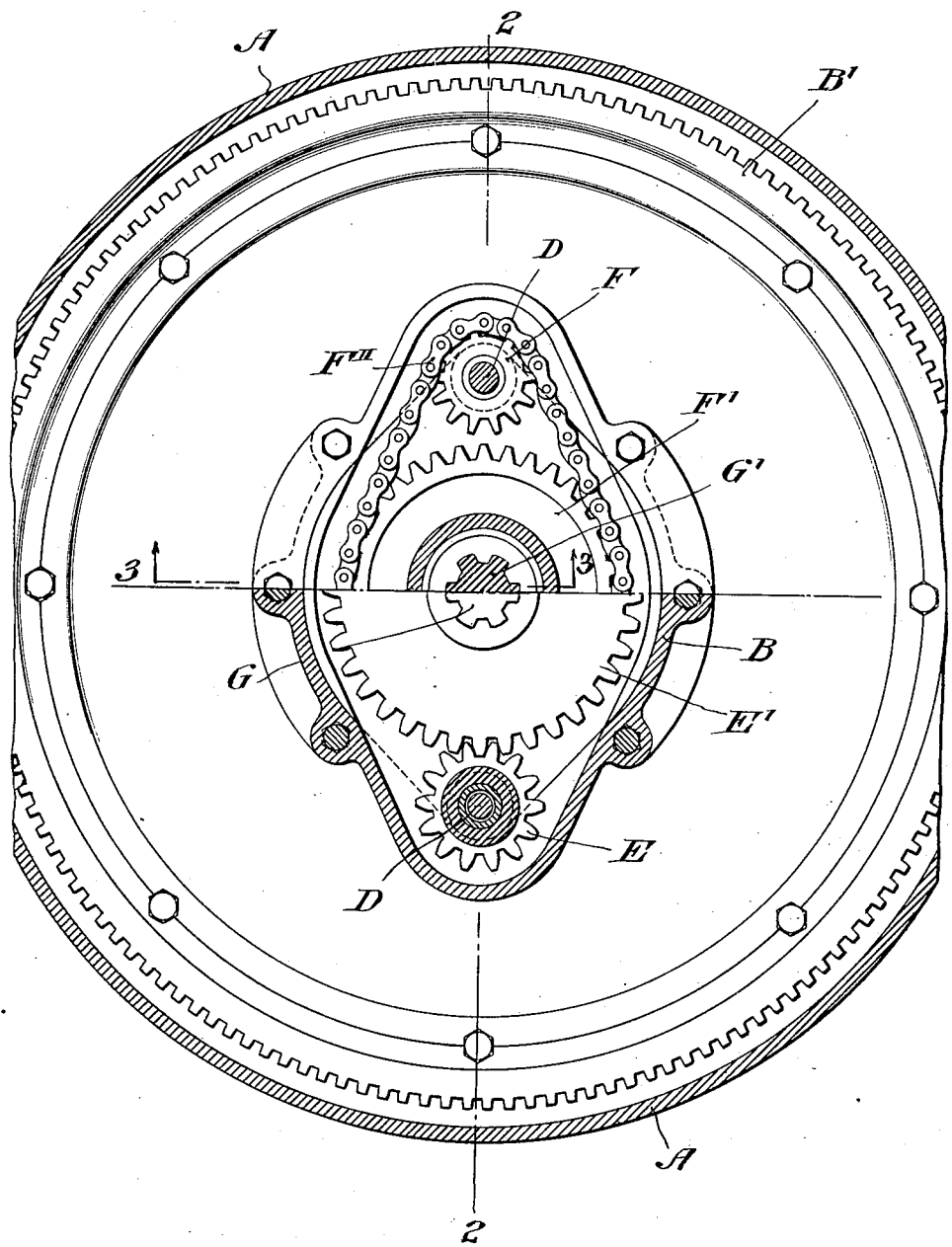

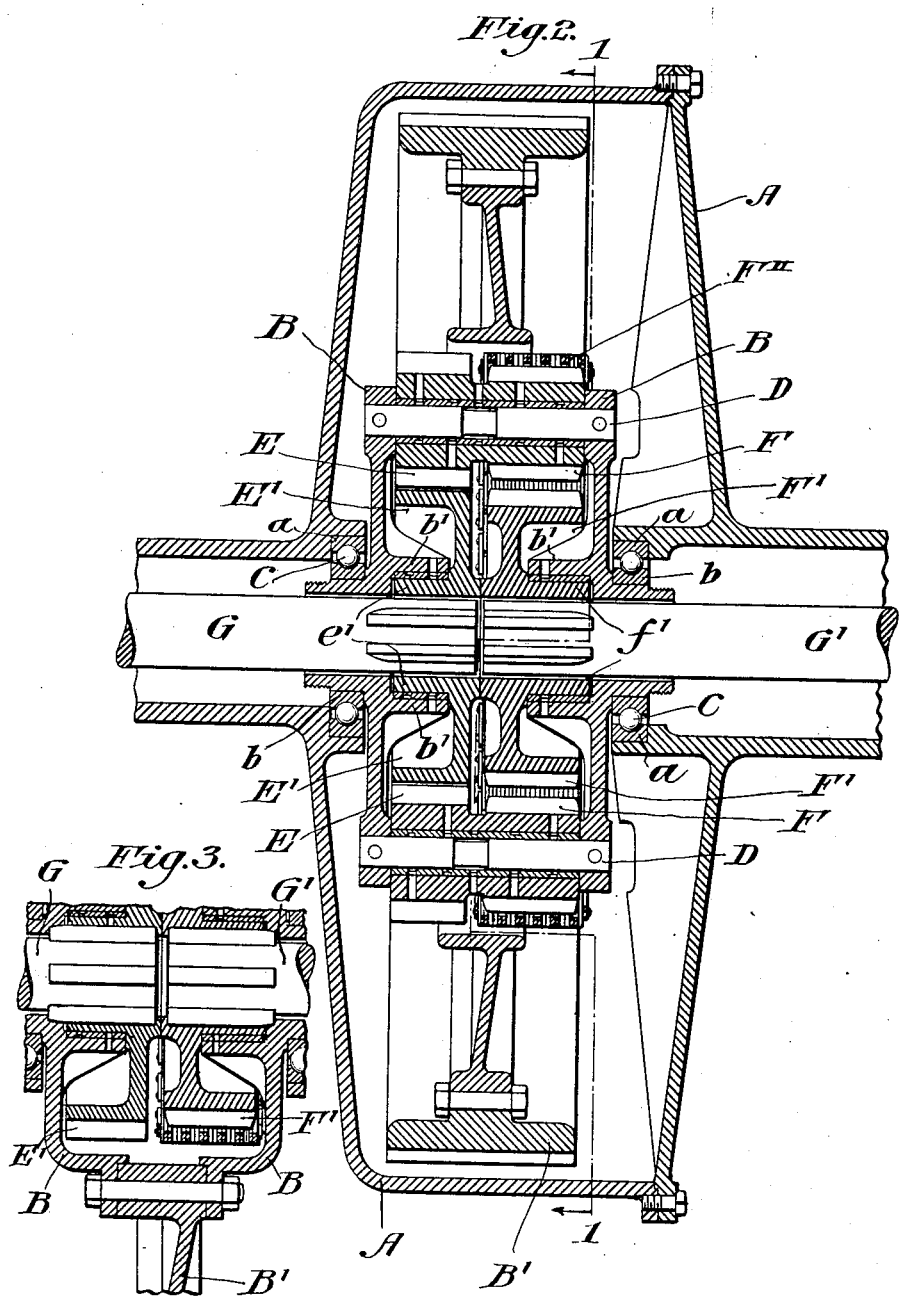

TRACY V. BUCKWALTER, OF ALTOONA, PENNSYLVANIA.

DIFFERENTIAL-POWER-TRANSMITTING MECHANISM.

1,086,644.  Specification of Letters Patent.  Patented Feb. 10, 1914.

Application filed October 11, 1912. Serial No. 725,112.

*To all whom it may concern:*

Be it known that I, TRACY V. BUCKWALTER, a citizen of the United States, residing at Altoona, in the county of Blair and State of Pennsylvania, have invented certain Improvements in Differential - Power - Transmitting Mechanism, of which the following is a specification.

My invention relates to mechanism adapted for transmitting power to the traction wheels of motor vehicles, and its primary object is to provide improved means of flexible character whereby the power shall be differentiated and transmitted to the respective wheel driving shafts proportionately to their loads, with compensation for differences in speed (such as result in movement around curves), unequal distribution of load, irregularities of spring action, variations in tractional resistance in the path of movement, differences in relative wheel elevations and diameters, and generally, actions producing torsional and other irregular stresses. The mechanism effects the further advantages of reducing the number of gears commonly used, reducing the space required for the differential gears, reducing the number of bearings and the friction, and simplifying and cheapening the construction.

In the accompanying drawings, Figure 1 is a sectional side view taken on the line 1—1 of Fig. 2, in illustration of my improvements; Fig. 2 is a transverse sectional view taken on the line 2—2 of Fig. 1, and Fig. 3 is a sectional view taken on the line 3—3 of Fig. 1.

The mechanism, as illustrated in the drawings, comprises the casing A having the ball rings $a$ fixed therein, the housings B having the ball rings $b$ fixed thereon and engaged within the rings $a$ by the balls C, the gear B′ fixed to the housings, the diametrically disposed spindles D fixed in the housings, the integrally connected pinion or spur gear E and sprocket wheel F journaled on each spindle, the gear wheel E′ meshing with the pinions E and having the ring or hub $e'$ journaled within a ring or hub $b'$ of a housing, the sprocket wheel F′ connected with the sprockets F by the sprocket chain or link belt F″ and having the ring or hub $f'$ journaled with a hub or ring $b'$ of a housing, and the alined shafts G and G′ fixed to the respective wheels E′ and F′.

Power transmitted to the wheel, comprising the parts B and B′, gives a planetary movement to the pinions or gears E and the sprockets F relative to the gear wheel E′ and the sprocket wheel F′, the wheel E′ being driven directly to revolve the shaft G, and the wheel F′ being driven indirectly through the chain F″ to revolve the shaft G′. It will be understood that the resistances offered by the wheel E′ and the chain F″ to the respective wheels E and F are in opposite directions so that these wheels E and F do not revolve on the spindles D when such resistances are equal. But when different resistances or loads are opposed to the wheels E and F by the wheels F′ and the chain F″, the power is transmitted to the shafts G and G′ proportionately to such loads. The flexible character of the differential mechanism obviates defects due to twisting, end thrusts and other irregularities to or in the action of the solid gear trains commonly used for transmitting power to the shafts which drive the traction wheels of motor vehicles.

Having described my invention, I claim:

1. The differential power transmitting mechanism comprising a driving wheel, a pinion and a sprocket wheel carried thereby, alined shafts relative whereto said driving wheel revolves, a gear and a sprocket wheel fixed to the respective shafts, said pinion engaging said gear wheel, and a sprocket chain connecting said sprocket wheels.

2. The differential power transmitting mechanism comprising the combination of a casing, a wheel journaled within said casing, integrally connected gear and sprocket wheels carried by and journaled eccentrically to the wheel aforesaid, independently revoluble gear and sprocket wheels journaled concentrically to said wheel first named, said gear wheels being in mesh, a belt engaging said sprocket wheels, and alined shafts revoluble relatively to said wheel first named and on which said independently revoluble gear and sprocket wheels are fixed.

3. The differential power transmitting mechanism comprising the combination of a pair of alined shafts, a gear wheel fixed on one of said shafts, a belt wheel fixed on the other of said shafts, a wheel concentric and journaled relative to the wheels aforesaid, integrally connected gear and belt wheels journaled relatively to said third named wheel and revolved thereby around said first named wheels, said gear wheels being in mesh, and a belt connecting said belt wheels.

4. The differential power transmitting mechanism comprising the combination of a pair of alined shafts, a gear wheel fixed to one of said shafts, a sprocket wheel fixed to the other of said shafts, said wheels having cylindrical bearings, a wheel having cylindrical bearings journaled on the bearings aforesaid, a casing having bearings, said last named wheel having bearings journaled within the bearings of said casing, journals carried by said last named wheel, integrally connected pinion and sprocket wheels carried by each of said journals, said gear wheel engaging said pinion, and a sprocket chain connecting said sprocket wheels.

5. The differential power transmitting mechanism comprising a wheel having a housing, a spindle carried by said housing, an integrally connected pinion and sprocket wheel carried by said spindle within said housing, a revoluble gear wheel concentric with said wheel first named and revoluble within said housing, said gear wheel meshing with said pinion, a sprocket wheel concentric with said wheel first named and revoluble within said housing, and a sprocket chain connecting said sprocket wheels.

6. The differential power transmitting mechanism comprising independently revoluble alined shafts, a driving wheel, and differential mechanism connecting said wheel with the respective shafts, said mechanism comprising a sprocket wheel fixed to one of said shafts, a sprocket wheel carried by said wheel first named around said sprocket wheel first named, a sprocket chain connecting said sprocket wheels and a casing having bearings whereby said driving wheel is journaled.

In witness whereof I have hereunto set my name this 9th day of October, 1912, in the presence of the subscribing witnesses.

TRACY V. BUCKWALTER.

Witnesses:
CHARLES N. BUTLER,
GEO. A. CUNNEY.

Copies of this patent may be obtained for five cents each, by addressing the "Commissioner of Patents, Washington, D. C."